United States Patent
Wang

(10) Patent No.: US 11,997,717 B2
(45) Date of Patent: May 28, 2024

(54) RANDOM ACCESS METHOD AND APPARATUS, NETWORK DEVICE, AND TERMINAL

(71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 632 days.

(21) Appl. No.: 17/182,109

(22) Filed: Feb. 22, 2021

(65) Prior Publication Data
US 2021/0176781 A1    Jun. 10, 2021

Related U.S. Application Data

(63) Continuation of application No. PCT/CN2018/106941, filed on Sep. 21, 2018.

(51) Int. Cl.
*H04W 74/0833*    (2024.01)
*H04W 74/00*    (2009.01)
*H04W 80/02*    (2009.01)

(52) U.S. Cl.
CPC ..... *H04W 74/0833* (2013.01); *H04W 74/004* (2013.01); *H04W 74/006* (2013.01); *H04W 80/02* (2013.01)

(58) Field of Classification Search
CPC ........... H04W 74/0833; H04W 74/004; H04W 74/006; H04W 80/02
See application file for complete search history.

(56) References Cited

U.S. PATENT DOCUMENTS 11,765,774 B2 *  9/2023  Pan ............... H04W 52/36
                                                370/329
11,770,855 B2 *  9/2023  Ly ................ H04W 74/0833
                                                370/329

(Continued)

FOREIGN PATENT DOCUMENTS

CN    108282874 A    7/2018
CN    108282895 A    7/2018

(Continued)

OTHER PUBLICATIONS

First Office action issued in corresponding European Application No. 18934472.4, dated Mar. 4, 2022, 9 pages.

(Continued)

*Primary Examiner* — Chandrahas B Patel
(74) *Attorney, Agent, or Firm* — BAYES PLLC

(57) ABSTRACT

The embodiments of the present disclosure provide a random access method and apparatus, a network device, and a terminal. The method includes a network device sending first configuration information corresponding to a preamble and second configuration information corresponding to a physical random access channel (PRACH) resource; the network device receiving MSG1, and determining the format of an RAR on the basis of at least one of the preamble corresponding to the MSG1, a PRACH resource corresponding to the MSG1, or whether MSG3 is detected within a first time range; and the network device sending MSG2 on the basis of the format of the RAR.

12 Claims, 7 Drawing Sheets

(56) References Cited

U.S. PATENT DOCUMENTS

| | | | | |
|---|---|---|---|---|
| 2017/0251456 | A1* | 8/2017 | Radulescu | H04W 48/00 |
| 2018/0116000 | A1 | 4/2018 | Ly et al. | |
| 2018/0139787 | A1 | 5/2018 | Islam et al. | |
| 2018/0205516 | A1 | 7/2018 | Jung et al. | |
| 2020/0367288 | A1* | 11/2020 | Dahlman | H04W 74/0833 |
| 2021/0168859 | A1* | 6/2021 | Yang | H04W 76/11 |

FOREIGN PATENT DOCUMENTS

| | | |
|---|---|---|
| CN | 108282901 A | 7/2018 |
| WO | 2017/147549 A1 | 8/2017 |
| WO | 2018126879 A1 | 7/2018 |
| WO | 2018127240 A1 | 7/2018 |
| WO | 2020/056721 A1 | 3/2020 |

OTHER PUBLICATIONS

First Office action issued in corresponding India Application No. 202127007405, dated Jan. 19, 2022, 6 pages.

Extended European Search Report issued in corresponding European Application No. 18934472.4, dated Aug. 30, 2021, 16 pages.

"Two-step RACH procedure for NR-U", Agenda Item: 11.2.1.1, Source: Huawei, HiSilicon, 3GPP TSG-RAN WG2 Meeting #103, R2-1811937, Gothenburg, Sweden, Aug. 20-24, 2018, 4 pages.

"2-step RACH to 4-step RACH fallback", Agenda: 3.2.1.4, Source: Sony, 3GPP TSG RAN WG2 NR Adhoc, R2-1700137, Spokane, USA, Jan. 17-19, 2017, 3 pages.

"Differentiation between 2-step and 4-step RACH", Agenda Item: 11.13, Source: vivo, 3GPP TSG-RAN WG2 Meeting #105bis, R2-1903075, Xi'an, China, Apr. 8-12, 2019, 3 pages.

'Fall back mechanisms for 2-steps RACH', Agenda Item: 11.13.3, Source: OPPO, 3GPP TSG-RAN WG2 Meeting #107, R2-1908771, Prague, Czech Republic, Aug. 26-Aug. 30, 2019, 3 pages.

PCT Written Opinion of The International Searching Authority issued in corresponding International Application No. PCT/CN2018/106941, dated Jun. 19, 2019, 7 pages.

"3rd Generation Partnership Project; Technical Specification Group Radio Access Network; NR; Radio Resource Control (RRC) protocol specification (Release 16)", 3GPP TS 38.331 V16.2.0 (Sep. 2020), 916 pages.

First Office Action issued in corresponding Chinese Application No. 202110275694.X, dated Jul. 8, 2022, 26 pages.

Priority Review issued in corresponding Chinese Application No. 202110275694.X, dated Jun. 28, 2022, 6 pages.

Extended European Search Report issued in corresponding European application No. 23165722.2, dated Jul. 4, 2023.

Ericsson, "On Two-step Random Access and Random Access Latency", Tdoc R2-1700413, 3GPP TSG-RAN WG2 NR Ad hoc Spokane, Washington, USA, Jan. 17-19, 2017.

CATT, "Consideration on 2-step RA", R2-1700205, 3GPP TSG RAN WG2 Meeting Ad Hoc Spokane, USA, Jan. 17-19, 2017.

* cited by examiner

RANDOM ACCESS METHOD AND APPARATUS, NETWORK DEVICE, AND TERMINAL

CROSS-REFERENCE TO RELATED APPLICATION

This application is a continuation of International Application No. PCT/CN2018/106941, filed Sep. 21, 2018, the entire contents of which are incorporated herein by reference.

BACKGROUND

The embodiments of the present disclosure relate to the field of mobile communication technology, and more particularly, to a random access method and apparatus, a network device, and a terminal.

When a User Equipment (UE) accesses a network and obtains a Radio Resource Control (RRC) connection, a random access procedure is required first. At present, a four-step random access procedure (referred to as 4 step RACH for short) is used in the random access procedure. In order to shorten the time delay of the random access procedure and quickly enter the network to start services, a two-step random access procedure (referred to as 2 step RACH for short) is proposed. How to support the 4 step RACH and the 2 step RACH in the network is a problem to be solved.

SUMMARY

The embodiments of the present disclosure provide a random access method and apparatus, a network device, and a terminal.

The random access method provided by the embodiments of the present disclosure includes sending, by a network device, first configuration information corresponding to a preamble and second configuration information corresponding to a physical random access channel (PRACH) resource; receiving, by the network device, MSG1, and determining a format of random access response (RAR) based on at least one of a preamble corresponding to the MSG1, a PRACH resource corresponding to the MSG1, or whether MSG3 is detected within a first time range; and sending, by the network device, MSG2 based on the format of RAR.

The random access method provided by the embodiments of the present disclosure includes obtaining, by a terminal, first configuration information corresponding to a preamble and second configuration information corresponding to a PRACH resource, where the first configuration information includes a first set of preambles used for a two-step random access procedure and a second set of preambles used for a four-step random access procedure, and/or the second configuration information includes a first PRACH resource used for the two-step random access procedure and a second PRACH resource used for the four-step random access procedure; if the terminal initiates the two-step random access procedure, selecting a first preamble from the first set of preambles and/or selecting the first PRACH resource by the terminal for sending MSG1; and if the terminal initiates the four-step random access procedure, selecting a second preamble from the second set of preambles and/or selecting the second PRACH resource by the terminal for sending MSG1.

The random access apparatus provided by the embodiments of the present disclosure includes a configuration unit configured to send first configuration information corresponding to a preamble and second configuration information corresponding to a PRACH resource; a receiving unit configured to receive MSG1; a determining unit configured to determine a format of RAR, based on at least one of a preamble corresponding to the MSG1, a PRACH resource corresponding to the MSG1, or whether MSG3 is detected the first time range; and a sending unit, configured to send MSG2, based on the format of RAR.

The random access apparatus provided by the embodiments of the present disclosure includes an obtaining unit, configured to obtain first configuration information corresponding to a preamble and second configuration information corresponding to a PRACH resource, where the first configuration information includes a first set of preambles for a two-step random access procedure and a second set of preambles for a four-step random access procedure, and/or the second configuration information includes a first PRACH resource for the two-step random access procedure and a second PRACH resource for the four-step random access procedure;

a selecting unit, configured to, if the two-step random access procedure is initiated, select a first preamble from the first set of preambles and/or select the first PRACH resource for sending MSG1; and if the four-step random access procedure is initiated, select a second preamble from the second set of preambles and/or select the second PRACH resource for sending MSG1; and a sending unit configured to send the MSG1.

The network device provided by the embodiments of the present disclosure includes a processor and a memory, where the memory is used to store a computer program, and the processor is configured to call and run the computer program stored in the memory to execute the random access method described above.

The terminal provided by the embodiments of the present disclosure includes a processor and a memory, where the memory is used to store a computer program and the processor is configured to call and run the computer program stored in the memory to execute the random access method described above.

A chip provided by the embodiments of the present disclosure is configured to implement the random access method described above.

Specifically, the chip includes a processor configured to call and run a computer program from a memory to enable a device installed with the chip to execute the random access method described above.

A computer-readable storage medium provided by the embodiments of the present disclosure is configured to store a computer program, where the computer program makes a computer to execute the random access method described above.

A computer program product provided by the embodiments of the present disclosure includes computer program instruction, where the computer program instruction makes a computer to execute the random access method described above.

A computer program provided by the embodiments of the present disclosure enables a computer to execute the random access method described above when the computer program runs on the computer.

By the above technical solutions, the network side configures independent resources (an independent preamble and/or an independent PRACH resource) for the two-step random access procedure and the four-step random access procedure. Therefore the terminal can use the resource corresponding to the two-step random access procedure to initiate the MSG1 in the two-step random access procedure, and use the resource corresponding to the four-step random access procedure to initiate the MSG1 in the four-step random access procedure. The network side can determine the format of RAR according to the resource corresponding to the MSG1, so as to send the MSG2 to the terminal correctly and enable the random access procedure to be performed correctly. On the other hand, the network side configures a shared resource (a shared preamble and a shared PRACH resource) for the two-step random access procedure and the four-step random access procedure. When the network side receives the MSG1, it determines whether the MSG3 is also received, and determines the format of RAR according to whether the MSG3 is received, so as to send the MSG2 to the terminal correctly and enable the random access procedure to be performed correctly.

BRIEF DESCRIPTION OF THE DRAWINGS

The appending drawings described herein are used to provide a further understanding of the present disclosure and constitute a part of the present disclosure. The schematic embodiments and the description thereof are used to explain the present disclosure, and do not constitute the improper limitation of the present disclosure. In the drawings:

FIG. 3 (b) is the format of E/T/RAPID MAC subheader;

FIG. 3 (c) is the format of MAC PDU (including MAC RARs);

FIG. 3 (d) is a schematic diagram of MAC RAR;

DETAILED DESCRIPTION

The technical solutions in the embodiments of the present disclosure will be described below in conjunction with the drawings in the embodiments of the present disclosure. Obviously, the described embodiments are part of the embodiments of the present disclosure, rather than all of them. Based on the embodiments in the present disclosure, all the other embodiments obtained by those of ordinary skill in the art without creative work fall within the protection scope of the present disclosure.

The technical solutions in the embodiments of the present disclosure can be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system, etc.

Figure 1:
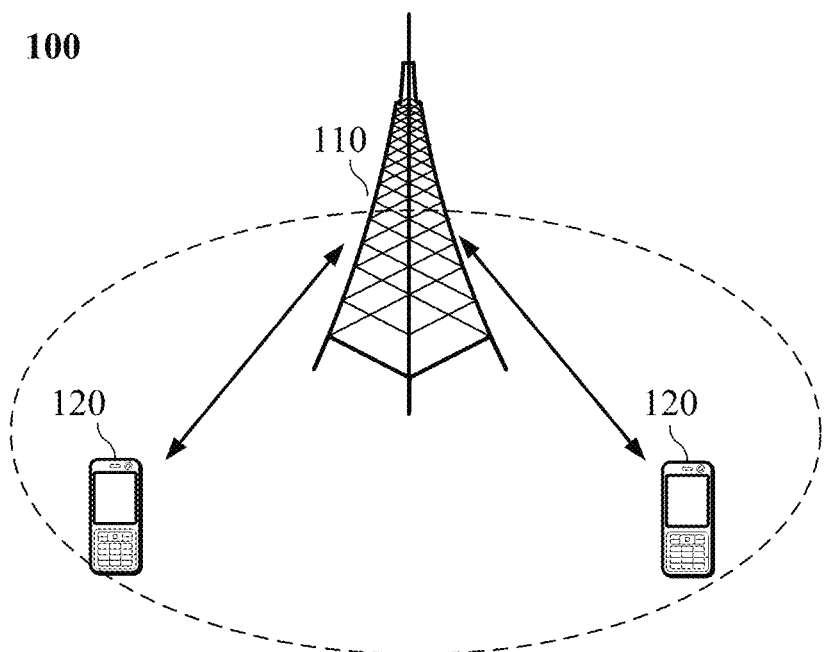
FIG. 1 is a schematic diagram of a communication system architecture provided by the embodiments of the present disclosure.

Exemplarily, a communication system 100 applied in the embodiments of the present disclosure is shown in FIG. 1. The communication system 100 may include a network device 110, which may be a device that communicates with a terminal 120 (or referred to as a communication terminal or a terminal). The network device 110 may provide communication coverage for a specific geographic area, and communicate with the terminal located within the coverage area. Optionally, the network device 110 may be a Base Transceiver Station (BTS) in a GSM system or a CDMA system, and may also be a Node B (NB) in a WCDMA system, and may also be an Evolutional Node B (eNB or NodeB) in an LTE system, or a wireless controller in a Cloud Radio Access Network (CRAN), or the network device may be a mobile switching center, a relay station, an access point, an in-vehicle device, a wearable device, a hub, a switch, a bridge, a router, a network side device in a 5G network or a network device in the future evolved Public Land Mobile Network (PLMN), etc.

The communication system 100 also includes at least one terminal 120 located within the coverage area of the network device 110. As the "terminal" used herein, it includes but is not limited to the connection via a wired line, such as via a Public Switched Telephone Network (PSTN), a Digital Subscriber Line (DSL), a digital cable, a direct cable connection; and/or another data connection/network; and/or via a wireless interface, for example, a transmitter for a cellular network, a Wireless Local Area Network (WLAN), a digital TV network such as a DVB-H network, a satellite network and an AF-FM broadcast; and/or an apparatus of another terminal which is arranged to receive/send communication signals; and/or an Internet of Things (IoT) device. The terminal arranged to communicate via a wireless interface may be referred to as a "wireless communication terminal," a "wireless terminal," or a "mobile terminal." Examples of mobile terminals include but are not limited to a satellite or cellular phone; a Personal Communications System (PCS) system that may combine a cellular wireless phone with data processing, fax and data communication capabilities; a PDA that may include a radio phone, a pager, an Internet/intranet access, a Web browser, a memo pad, a calendar, and/or a Global Positioning System (GPS) receiver; and a conventional laptop and/or a palmtop receiver or other electric apparatus including a radiophone transceiver. The terminal may refer to an access terminal, a User Equipment (UE), a user unit, a user station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a personal digital assistant (PDA), a handheld device with a wireless communication function, a computing device or other processing devices connected to wireless modems, an in-vehicle device, a wearable device, a terminal in a 5G network or a terminal in the future evolved PLMN, etc.

Optionally, Device to Device (D2D) communication may be performed between the terminals 120.

Optionally, a 5G system or 5G network may also be referred to as a New Radio (NR) system or NR network.

FIG. 1 exemplarily illustrates one network device and two terminals. Optionally, the communication system 100 may include a plurality of network devices, and the coverage area of each network device may include other numbers of terminals, which is not limited by the embodiments of the present disclosure.

Optionally, the communication system 100 may also include other network entities such as a network controller, a mobile management entity, etc., which is not limited by the embodiments of the present disclosure.

It should be understood that a device with a communication function in the network/system in the embodiments of the present disclosure can be referred to as a communication device. By the example of the communication system 100 shown in FIG. 1, the communication device may include a network device 110 and a terminal 120 with a communication function, and the network device 110 and the terminal 120 may be the specific devices described above, which will not be elaborated here; and the communication device may also include other devices in the communication system 100, such as other network entities such as a network controller, a mobile management entity, etc., which is not limited by the embodiments of the present disclosure.

It should be understood that the terms "system" and "network" are often used interchangeably herein. The term "and/or" herein is only to describe a kind of association relationship among associated objects, and means that there may be three kinds of relationships. For example, A and/or B may mean that there are the following three cases: A exists alone, A and B exist at the same time, and B exists alone. In addition, the character "/" herein generally indicates that the associated objects are in an "or" relationship.

In order to satisfy people's pursuit of speed, delay, high-speed mobility, energy efficiency of services, as well as diversity and complexity of services in future life, the 3rd Generation Partnership Project (3GPP) of the International Standards Organization began to develop the 5$^{th}$ Generation (5G) mobile communication technology.

The air interface part of 5G mobile communication technology is called New Radio (NR). In the early deployment of NR, it is difficult to achieve the complete NR coverage, therefore the typical network coverage is the combination of Long Term Evolution (LTE) coverage and NR coverage. In addition, in order to protect the early investment of mobile operators on LTE, a tight interworking mode between LTE and NR is proposed. NR cells may also be deployed independently. In addition, since each NR cell is operated based on beam, one cell has a plurality of beams.

The technical solutions in the embodiments of the present disclosure are mainly applied to 5G mobile communication system. The technical solutions in the embodiments of the present disclosure are not limited to 5G mobile communication system, and may also be applied to other types of mobile communication system. The main application scenarios of 5G mobile communication system are described below.

1) eMBB scenario: the target of eMBB is for the user to obtain multimedia content, services, and data, and its services demand is growing rapidly. Since eMBB may be deployed in different scenarios, such as indoor, urban, rural, etc., and its services capabilities and requirements vary greatly, it is necessary to analyze the services in conjunction with specific deployment scenarios.

2) URLLC scenario: typical applications of URLLC include industrial automation, power automation, telemedicine operation, traffic safety guarantee, etc.

3) mMTC scenario: typical characteristics of URLLC include high connection density, small data amount, delay-insensitive services, low cost and long service life of modules, etc.

Figure 2:
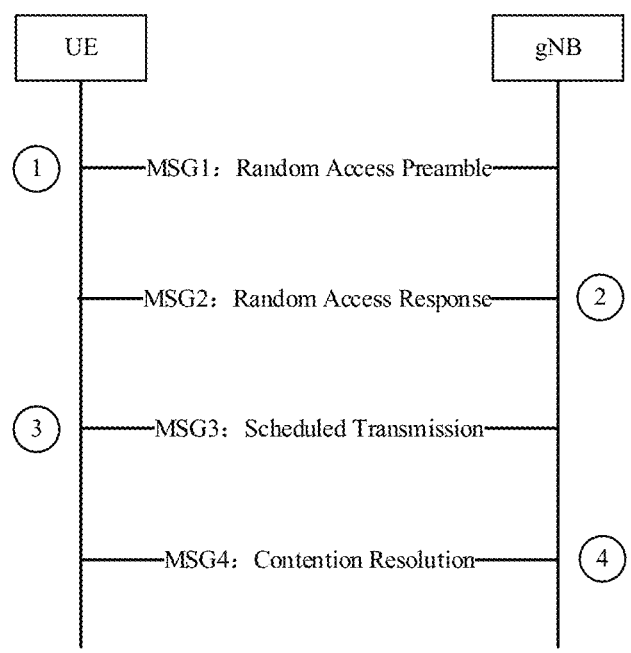
FIG. 2 is a flow chart of the four-step random access procedure.
Figure 3A:
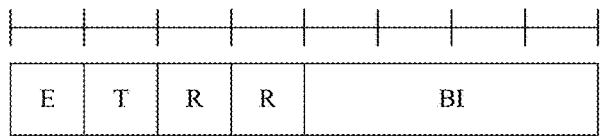
FIG. 3 (a) is the format of E/T/R/R/BI MAC subheader.
Figure 3B:
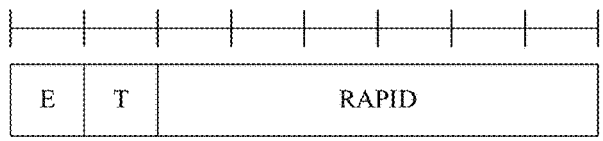
Figure 3C:
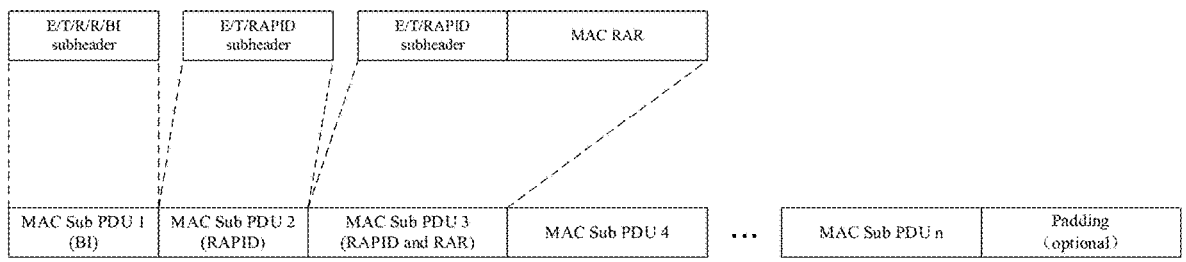
Figure 3D:
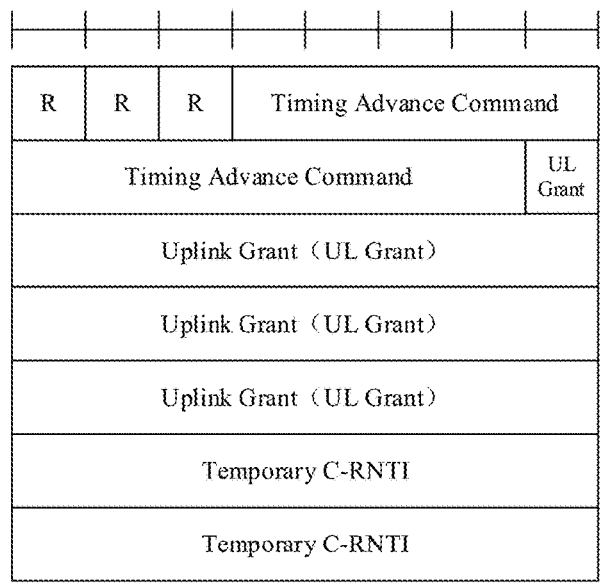

The random access procedure is required first for a UE to access the network side to obtain RRC connection, referring to FIG. 2, which is a flow chart of four-step random access procedure and includes the following steps.

1. The UE sends to gNB MSG1: a random access preamble.

Specifically, the UE selects a PRACH resource, and sends the selected preamble on the PRACH resource. Here, there are 64 preambles, and each preamble corresponds to one index, a range of the index being from 0 to 63.

The gNB sends to the UE MSG2: random access response (RAR).

Specifically, the gNB replies to the MSG1 and sends a random access response to the UE, and the UE, according to the PRACH resource, which sends the preamble, calculates a random access-radio network temporary identification (RA-RNTI) for scrambling scheduling information of the MSG2. The Media Access Control (MAC) layer data format of RAR is shown in FIG. 3 (a), FIG. 3 (b), FIG. 3 (c), and FIG. 3 (d), where FIG. 3 (a) is the format of E/T/R/R/BI MAC subheader, FIG. 3 (b) is the format of E/T/RAPID MAC subheader, FIG. 3 (c) is the format of MAC PDU (including MAC RARs), and FIG. 3 (d) is a schematic diagram of MAC RAR.

The UE sends to the gNB MSG3: Scheduled Transmission.

Specifically, in the MSG2, the network side may allocate an uplink resource for sending the MSG3 to the UE, and the UE sends the MSG3 on the uplink resource (UL grant) allocated by the network side.

The gNB sends to the UE MSG4: Contention Resolution.

In order to shorten the time delay of the random access procedure, and quickly enter the network side to carry out services, a two-step random access procedure is proposed. In the two-step random access procedure, MSG1 and MSG3 are sent at the same time or almost at the same time (here, MSG3 may be sent without waiting for MSG2), and MSG2 and MSG4 are sent together (one Physical Downlink Shared Channel (PDSCH) transmission or two PDSCHs transmission).

Figure 4:
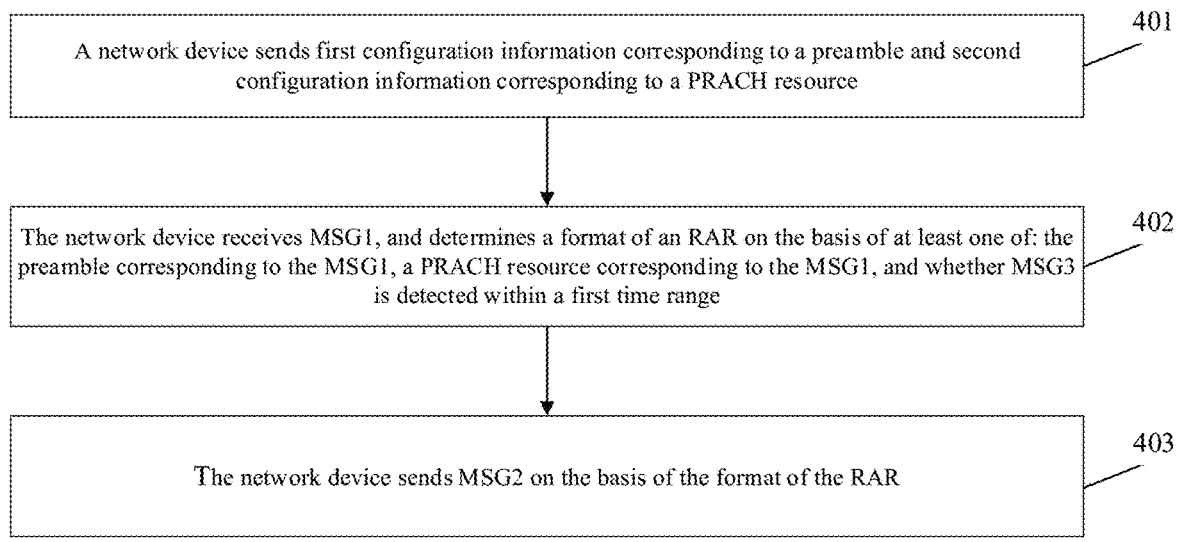
FIG. 4 is a first flow schematic diagram of the random access method provided by the embodiments of the present disclosure.

FIG. 4 is a first flow schematic diagram of the random access method provided by the embodiments of the present disclosure, as shown in FIG. 4, the random access method includes the following steps.

In step 401: the network device sends first configuration information corresponding to a preamble and second configuration information corresponding to a PRACH resource.

In the embodiments of the present disclosure, the network device may be a base station, such as a gNB in 5G and an eNB in 4G. In one embodiment, the network device sends the first configuration information corresponding to the preamble and the second configuration information corresponding to the PRACH resource through a system broadcast message.

In the embodiments of the present disclosure, the implementation of the first configuration information and the second configuration information may have the following cases.

Case 1: the first configuration information includes a first set of preambles for the two-step random access procedure and a second set of preambles for the four-step random access procedure, and the second configuration information includes a PRACH resource for the two-step random access procedure and the four-step random access procedure.

In this case, the network side allocates the preambles independently for the 2 step RACH and the 4 step RACH, and allocates the PRACH resource uniformly for the 2 step RACH and the 4 step RACH. For example, referring to FIG. 5, the network side configures for the 2 step RACH the first set of preambles, including Preamble0, Preamble1, Preamble2, and Preamble3, the network side configures for the 4 step RACH the second set of preambles, including Preamble4, Preamble5, Preamble6 and Preamble1, and the network side configures one PRACH resource for the 2 step RACH and the 4 step RACH. It can be seen that the preambles of the 2 step RACH and the 4 step RACH are configured independently.

Case 2: the first configuration information includes a set of preambles for the two-step random access procedure and the four-step random access procedure, and the second configuration information includes a first PRACH resource for the two-step random access procedure and a second PRACH resource for the four-step random access procedure.

In this case, the network side allocates the PRACH resources independently for the 2 step RACH and the 4 step RACH, and allocates the preambles uniformly for the 2 step RACH and the 4 step RACH. For example, referring to FIG. 6, the network side configures for the 2 step RACH and the 4 step RACH one set of preambles, including Preamble0, Preamble1, Preamble2, and Preamble3, and the network side configures PRACH0 for the 2 step RACH and PRACH1 for the 4 step RACH. It can be seen that the PRACH resources of the 2 step RACH and the 4 step RACH are configured independently.

Case 3: the first configuration information includes a first set of preambles for the two-step random access procedure and a second set of preambles for the four-step random access procedure, and the second configuration information includes a first PRACH resource for the two-step random access procedure and a second PRACH resource for the four-step random access procedure.

In this case, the network side allocates the preambles independently for the 2 step RACH and the 4 step RACH, and also allocates the PRACH resources independently for the 2 step RACH and the 4 step RACH. For example, referring to FIG. 7, the network side configures for the 2 step RACH the first set of preambles, including Preamble0, Preamble1, Preamble2, and Preamble3, and configures for the 4 step RACH the second set of preambles, including Preamble4, Preamble5, Preamble6 and Preamble1, and the network side configures PRACH0 for the 2 step RACH and configures PRACH1 for the 4 step RACH. It can be seen that both the preambles and the PRACH resources of the 2 step RACH and the 4 step RACH are configured independently.

Case 4: the first configuration information includes a set of preambles for the two-step random access procedure and the four-step random access procedure, and the second configuration information includes a PRACH resource for the two-step random access procedure and the four-step random access procedure.

In this case, the network side allocates the preambles and the PRACH resources uniformly for the 2 step RACH and the 4 step RACH. For example, referring to FIG. 8, the network side configures for the 2 step RACH and the 4 step RACH one set of preambles, including Preamble0, Preamble1, Preamble2, and Preamble3, and the network side configures one PRACH resource for the 2 step RACH and the 4 step RACH.

In the embodiments of the present disclosure, in order to implement transmission of the MSG3 in the 2 step RACH, the network device sends third configuration information corresponding to a PUSCH resource, where the PUSCH resource is used for transmission of the MSG3 in the two-step random access procedure. Referring to FIGS. 5 to 8, the network side may configure a set of PUSCH resources, and a terminal may select one PUSCH resource from the set of PUSCH resources for transmission of the MSG3, here, one PRACH resource is associated with PUSCH resources of n MSG3s, and the value of n depends on the network side capabilities.

In step 402: the network device receives MSG1, and determines a format of RAR based on at least one of a preamble corresponding to the MSG1, a PRACH resource corresponding to the MSG1, or whether MSG3 is detected within a first time range.

In the embodiments of the present disclosure, the MSG1 received by the network device may have the following cases.

A): Corresponding to Case 1 in the above step 401, the network device receives a first preamble and a second preamble on a same PRACH resource, where the first preamble belongs to the first set of preambles for the two-step random access procedure, and the second preamble belongs to the second set of preambles for the four-step random access procedure; and the network device determines that the first preamble corresponds to a first RAR format and the second preamble corresponds to a second RAR format, where the first RAR format is used for the two-step random access procedure, and the second RAR format is used for the four-step random access procedure. The network device carries a first RAR and a second RAR in a same random access response media access control protocol data unit (RAR MAC PDU), where the first RAR has the first RAR format and the second RAR has the second RAR format; and the network device sends the RAR MAC PDU.

Figure 5:
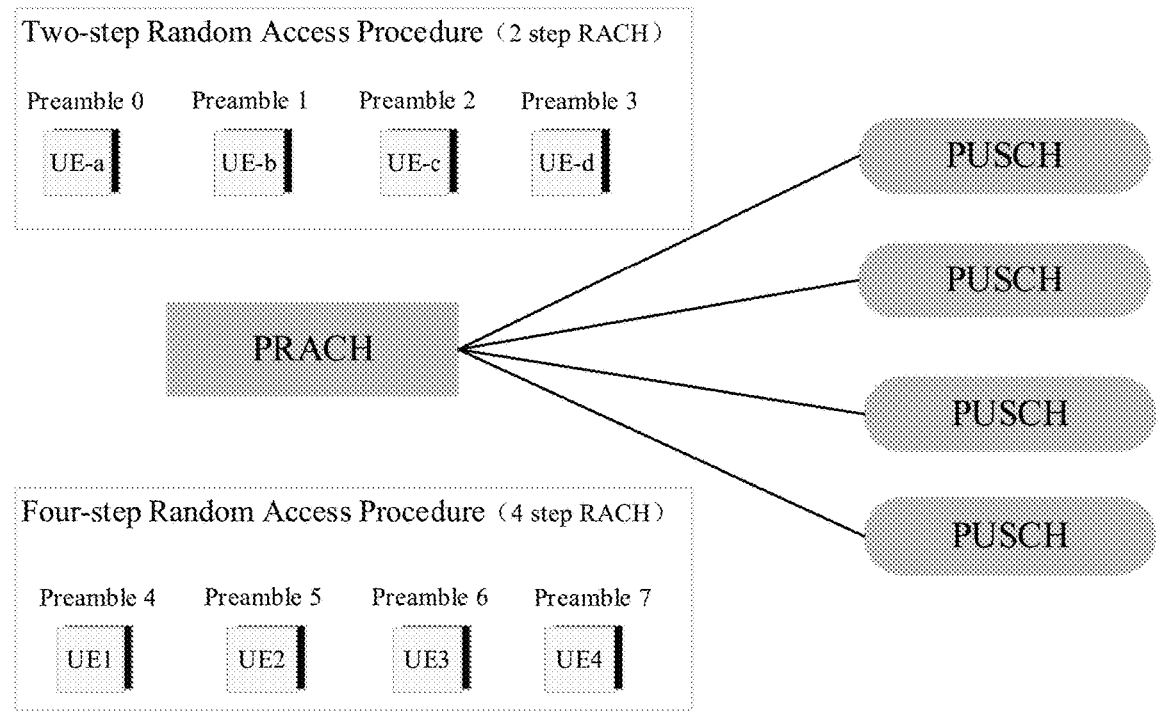
FIG. 5 is a first schematic diagram of the random access resource allocation provided by the embodiments of the present disclosure.

For example, referring to FIG. 5, UE-a initiates the 2 step RACH, selects Preamble0 from the first set of preambles, and sends Preamble0 on the configured PRACH resource (i.e., transmission of the MSG1 is achieved); and UE2 initiates the 4 step RACH, selects Preamble5 from the second set of preambles, and sends Preamble5 on the configured PRACH resource (i.e., transmission of the MSG1 is achieved). It can be seen that the 2 step RACH and the 4 step RACH send different preambles (Preamble0 and Preamble5) on the same PRACH resource, and the network side carries the RARs of two UEs (UE-a and UE2) in the same one RAR MAC PDU, and the network side may determine the specific RAR format of the two UEs (UE-a and UE2) through different preambles (Preamble0 and Preamble5), where the first RAR format refers to the RAR format corresponding to the 2 step RACH, and the second RAR format refers to the RAR format corresponding to the 4 step RACH (referring to FIG. 3(d)). Furthermore, since there is no need to allocate a PUSCH resource for the MSG2 of the 2 step RACH, the RAR format corresponding to the 2 step RACH lacks the uplink grant field (UL Grant) compared with the RAR format corresponding to the 4 step RACH.

B): Corresponding to Case 2 in the above step 401, the network device receives a first preamble on a first PRACH resource, and receives a first preamble or a second preamble on a second PRACH resource; and the network device determines that the first PRACH resource corresponds to the first RAR format, and the second PRACH resource corresponds to the second RAR format, where the first RAR format is used for the two-step random access procedure, and the second RAR format is used for the four-step random access procedure. The network device carries a first RAR in a first RAR MAC PDU, and carries a second RAR in a second RAR MAC PDU, where the first RAR has the first RAR format and the second RAR has the second RAR format, and the network device sends the first RAR MAC PDU and the second RAR MAC PDU.

Figure 6:
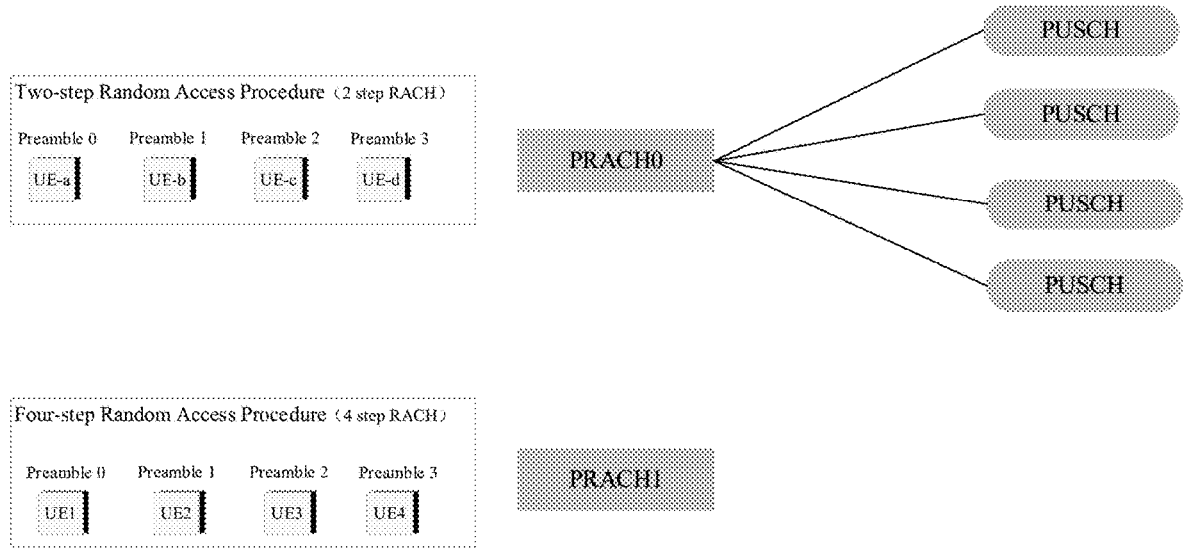
FIG. 6 is a second schematic diagram of the random access resource allocation provided by the embodiments of the present disclosure.

For example, referring to FIG. 6, UE-a initiates the 2 step RACH, selects Preamble0 from a set of preambles, and sends Preamble0 on the configured PRACH0 resource (i.e., transmission of the MSG1 is achieved); and UE2 initiates the 4 step RACH, selects Preamble0 or Preamble2 from the same set of preambles, and sends Preamble0 or Preamble2 on the configured PRACH1 resource (i.e., transmission of the MSG1 is achieved). It can be seen that regardless of whether the preambles selected by the 2 step RACH and the 4 step RACH are the same or not, the 2 step RACH and the 4 step RACH send preambles on different PRACH resources. Therefore, the network side carries the RARs of the two UEs (UE-a and UE2) in different RAR MAC PDUs, and the network side may distinguish the specific RAR formats of the two UEs (UE-a and UE2) through the RA-RNTIs of different PRACH resources, where the first RAR format refers to the RAR format corresponding to the 2 step RACH, and the second RAR format refers to the RAR format corresponding to the 4 step RACH (referring to FIG. 3 (d)). Furthermore, since there is no need to allocate a PUSCH resource for the MSG2 of the 2 step RACH, the RAR format corresponding to the 2 step RACH lacks the uplink grant field (UL Grant) compared with the RAR format corresponding to the 4 step RACH.

Figure 7:
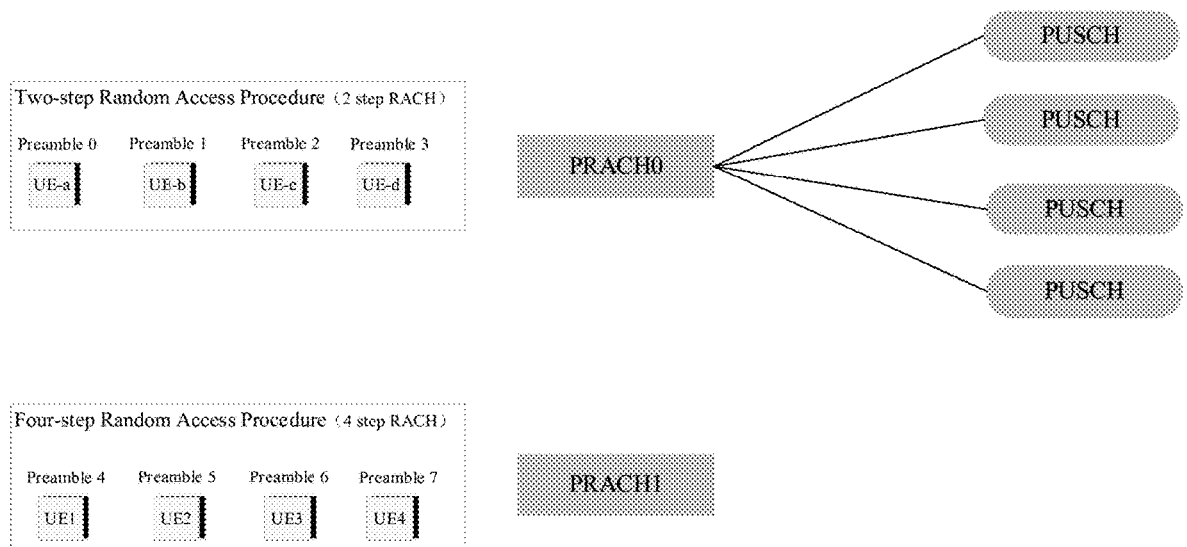
FIG. 7 is a third schematic diagram of the random access resource allocation provided by the embodiments of the present disclosure.

C): Corresponding to Case 3 in the above Step 401, the above scheme A) and scheme B) may be used in combination. Referring to FIG. 7, UE-a initiates the 2 step RACH, selects Preamble0 from a first set of preambles, and sends Preamble0 on the configured PRACH0 resource (i.e., transmission of the MSG1 is achieved); and UE2 initiates the 4 step RACH, selects Preamble5 from a second set of preambles, and sends Preamble5 on the configured PRACH1 resource (i.e., transmission of the MSG1 is achieved). It can be seen that the 2 step RACH and the 4 step RACH send different preambles (Preamble0 and Preamble5) on the different PRACH resources (PRACH0 and PRACH1), and the network side carries the RARs of the two UEs (UE-a and UE2) in different RAR MAC PDUs, and the network side may determine the specific RAR formats of the two UEs (UE-a and UE2) through different preambles (Preamble0 and Preamble5) and different PRACH resources (PRACH0 and PRACH1), where the first RAR format refers to the RAR format corresponding to the 2 step RACH, and the second RAR format refers to the RAR format corresponding to the 4 step RACH (referring to FIG. 3 (d)). Furthermore, since there is no need to allocate a PUSCH resource for the MSG2 of the 2 step RACH, the RAR format corresponding to the 2 step RACH lacks the uplink grant field (UL Grant) compared with the RAR format corresponding to the 4 step RACH.

D): Corresponding to Case 4 in the above Step 401, the network device receives two identical preambles on a same PRACH resource, and determines whether the MSG3 is detected within the first time range; if the network device detects the MSG3 within the first time range, a first RAR format is determined, where the first RAR format is used for the two-step random access procedure; and if the network device does not detect the MSG3 within the first time range, a second RAR format is determined, where the second RAR format is used for the four-step random access procedure. If the network device determines the first RAR format, the network device carries a first RAR in a RAR MAC PDU, and the network device sends the RAR MAC PDU, where the first RAR has the first RAR format; and if the network device determines the second RAR format, the network device carries a second RAR in the RAR MAC PDU, and the network device sends the RAR MAC PDU, where the second RAR has the second RAR format.

For example, referring to FIG. 7, UE-a initiates the 2 step RACH, selects Preamble0 from a set of preambles, and sends Preamble0 on the configured PRACH resource (i.e., transmission of the MSG1 is achieved); and UE2 initiates the 4 step RACH, selects Preamble0 from the same set of preambles, and sends Preamble0 on the configured PRACH resource (i.e., transmission of the MSG1 is achieved). It can be seen that the 2 step RACH and the 4 step RACH send the same preamble on the same PRACH resource. In this case, if the network side detects the MSG3, the network side considers that the priority of the 2 step RACH is higher than the priority of the 4 step RACH, and replies to the RAR corresponding to the 2 step RACH first; and if the network side cannot detect the MSG3, the network side replies to the RAR corresponding to the 4 step RACH; where the first RAR refers to the RAR corresponding to the 2 step RACH, and the second RAR refers to the RAR corresponding to the 4 step RACH (referring to FIG. 3 (d)). Furthermore, since there is no need to allocate a PUSCH resource for the MSG2 of the 2 step RACH, the RAR format corresponding to the 2 step RACH lacks the uplink grant field (UL Grant) compared with the RAR format corresponding to the 4 step RACH.

Furthermore, in order to enable the two UEs (UE-a and UE2) to distinguish whether the RAR replied from the network side is the RAR format corresponding to the 2 step RACH or the RAR format corresponding to the 4 step RACH, the network device carries first indication information in the RAR MAC PDU, where the first indication information is used to indicate whether the RAR MAC PDU carries the first RAR or the second RAR. Therefore, the terminal can decode the RAR based on the first indication information correctly.

In step 403: the network device sends the MSG2 based on the format of RAR.

It should be noted that if the network device determines that it needs to send the MSG2 corresponding to the 2 step RACH, the network device also sends MSG4 (i.e., Contention Resolution) at the same time. Furthermore, the PDSCH resources of the MSG2 and the MSG4 in the 2 step RACH may be scheduled by a same DCI, or by different DCIs.

Figure 9:
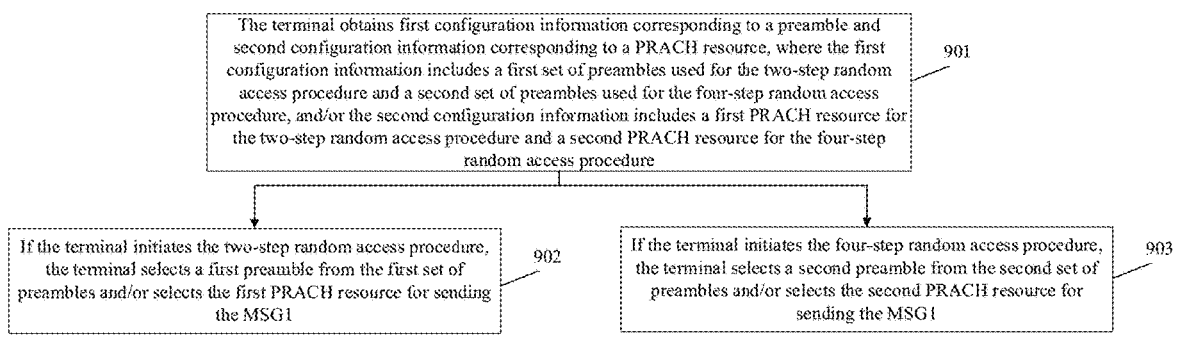
FIG. 9 is a second flow schematic diagram of the random access method provided by the embodiments of the present disclosure.

FIG. 9 is a second flow schematic diagram of the random access method provided by the embodiments of the present disclosure, as shown in FIG. 9, the random access method includes the following steps.

In step 901: a terminal obtains first configuration information corresponding to a preamble and second configuration information corresponding to a PRACH resource, where the first configuration information includes a first set of preambles used for the two-step random access procedure and a second set of preambles used for the four-step random access procedure, and/or the second configuration information includes a first PRACH resource for the two-step random access procedure and a second PRACH resource for the four-step random access procedure.

In the embodiments of the present disclosure, the terminal may be any device that can communicate with the network, such as a mobile phone, a tablet computer, a notebook, an in-vehicle terminal, etc.

In the embodiments of the present disclosure, the terminal receives the first configuration information and the second configuration information sent by the network device. Here, the network device may be a base station, such as a gNB in 5G and an eNB in 4G. In one embodiment, the terminal receives the first configuration information and the second configuration information sent by the network device through a system broadcast message.

In the embodiments of the present disclosure, the implementation of the first configuration information and the second configuration information may have the following cases.

Case 1: the first configuration information includes a first set of preambles used for the two-step random access procedure and a second set of preambles used for the four-step random access procedure, and the second configuration information includes a PRACH resource used for the two-step random access procedure and the four-step random access procedure.

In this case, the network side allocates the preambles independently for the 2 step RACH and the 4 step RACH, and allocates the PRACH resource uniformly for the 2 step RACH and the 4 step RACH. For example, referring to FIG. 5, the network side configures the first set of preambles for the 2 step RACH, including Preamble0, Preamble1, Preamble2 and Preamble3, and configures the second set of preambles for the 4 step RACH, including Preamble4, Preamble5, Preamble6 and Preamble7, and the network side configures one PRACH resource for the 2 step RACH and the 4 step RACH. It can be seen that the preambles of the 2 step RACH and the 4 step RACH are configured independently.

Case 2: the first configuration information includes a set of preambles used for the two-step random access procedure and the four-step random access procedure, and the second configuration information includes a first PRACH resource used for the two-step random access procedure and a second PRACH resource used for the four-step random access procedure.

In this case, the network side allocates the PRACH resources independently for the 2 step RACH and the 4 step RACH, and allocates the preambles uniformly for the 2 step RACH and the 4 step RACH. For example, referring to FIG. 6, the network side configures one set of preambles for the 2 step RACH and the 4 step RACH, including Preamble0, Preamble1, Preamble2, and Preamble3, and the network side configures PRACH0 for the 2 step RACH and configures PRACH1 for the 4 step RACH. It can be seen that the PRACH resources of the 2 step RACH and the 4 step RACH are configured independently.

Case 3: the first configuration information includes a first set of preambles used for the two-step random access procedure and a second set of preambles used for the four-step random access procedure, and the second configuration information includes a first PRACH resource used for the two-step random access procedure and a second PRACH resource used for the four-step random access procedure.

In this case, the network side allocates the preambles independently for the 2 step RACH and the 4 step RACH, and also allocates the PRACH resource independently for the 2 step RACH and the 4 step RACH. For example, referring to FIG. 7, the network side configures the first set of preambles for the 2 step RACH, including Preamble0, Preamble1, Preamble2 and Preamble3, and configures the second set of preambles for the 4 step RACH, including Preamble4, Preamble5, Preamble6 and Preamble1, and the network side configures PRACH0 for the 2 step RACH and configures PRACH1 for the 4 step RACH. It can be seen that the preambles and the PRACH resources of the 2 step RACH and the 4 step RACH are configured independently.

In the embodiments of the present disclosure, in order to implement transmission of the MSG3 in the 2 step RACH, the terminal obtains third configuration information corresponding to a PUSCH resource, where the PUSCH resource is used for transmission of the MSG3 in the two-step random access procedure. Referring to FIGS. 5 to 8, the network side may configure a set of PUSCH resources, and the terminal may select one PUSCH resource from the set of PUSCH resources for transmission of the MSG3. Here, one PRACH resource is associated with n PUSCH resources of the MSG3, and the value of n depends on the capabilities of the network side.

In step 902: if the terminal initiates the two-step random access procedure, the terminal selects a first preamble from the first set of preambles and/or selects the first PRACH resource for sending the MSG1.

For example: referring to FIG. 5, UE-a initiates the 2 step RACH, selects Preamble0 from the first set of preambles, and sends Preamble0 on the configured PRACH resource (i.e., transmission of the MSG1 is achieved).

For example: referring to FIG. 6, UE-a initiates the 2 step RACH, selects Preamble0 from a set of preambles, and sends Preamble0 on the configured PRACH0 resource (i.e., transmission of the MSG1 is achieved).

For example: referring to FIG. 7, UE-a initiates the 2 step RACH, selects Preamble0 from the first set of preambles, and sends Preamble0 on the configured PRACH0 resource (i.e., transmission of the MSG1 is achieved).

In the embodiments of the present disclosure, the third configuration information includes a set of PUSCH resources; and if the terminal initiates the two-step random access procedure, the terminal selects a first PUSCH resource from the set of PUSCH resources for sending the MSG3.

In step 903: if the terminal initiates the four-step random access procedure, the terminal selects a second preamble from the second set of preambles and/or selects the second PRACH resource for sending the MSG1.

For example: referring to FIG. 5, UE2 initiates the 4 step RACH, selects Preamble5 from the second set of preambles, and sends Preamble5 on the configured PRACH resource (i.e., transmission of the MSG1 is achieved).

For example: referring to FIG. 6, UE2 initiates the 4 step RACH, selects Preamble0 from a set of preambles, and sends Preamble0 on the configured PRACH1 resource (i.e., transmission of the MSG1 is achieved).

For example: referring to FIG. 7, UE2 initiates the 4 step RACH, selects Preamble5 from the second set of preambles, and sends Preamble5 on the configured PRACH1 resource (i.e., transmission of the MSG1 is achieved).

It should be noted that there is no order for the execution of the above step 902 and step 903.

Figure 8:
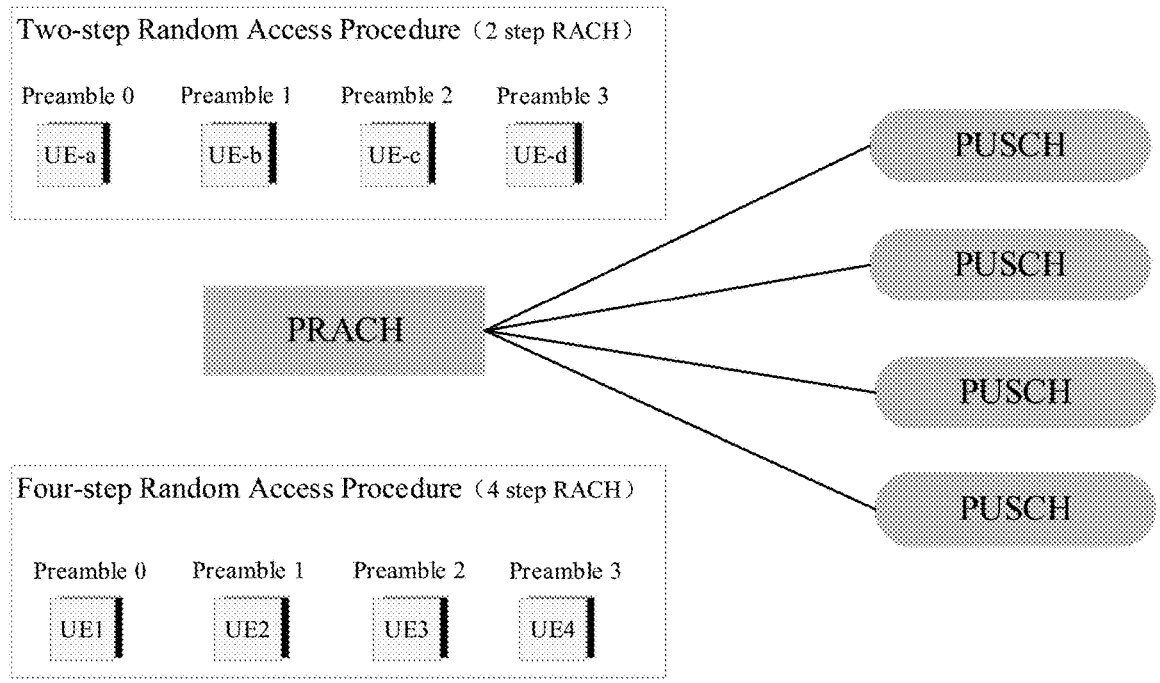
FIG. 8 is a fourth schematic diagram of the random access resource allocation provided by the embodiment of the present disclosure.

After receiving the MSG1, the network side may determine the format of RAR based on the preamble and/or the PRACH resource corresponding to the MSG1, which can be understood with reference to the above method shown in FIG. 8 for details.

In particular, if the preamble and the PRACH resource allocated by the network side are shared for the 2 step RACH and the 4 step RACH, it may happen that the 2 step RACH and the 4 step RACH send the same preamble on the same PRACH resource. At this time, the network side needs to carry indication information in the replied MSG2. Specifically, the terminal receives the MSG2, where the RAR MAC PDU in the MSG2 carries first indication information, and the first indication information is used to indicate whether the RAR MAC PDU carries the first RAR or the second RAR; and the terminal decodes based on the first indication information to obtain the first RAR or the second RAR.

Figure 10:
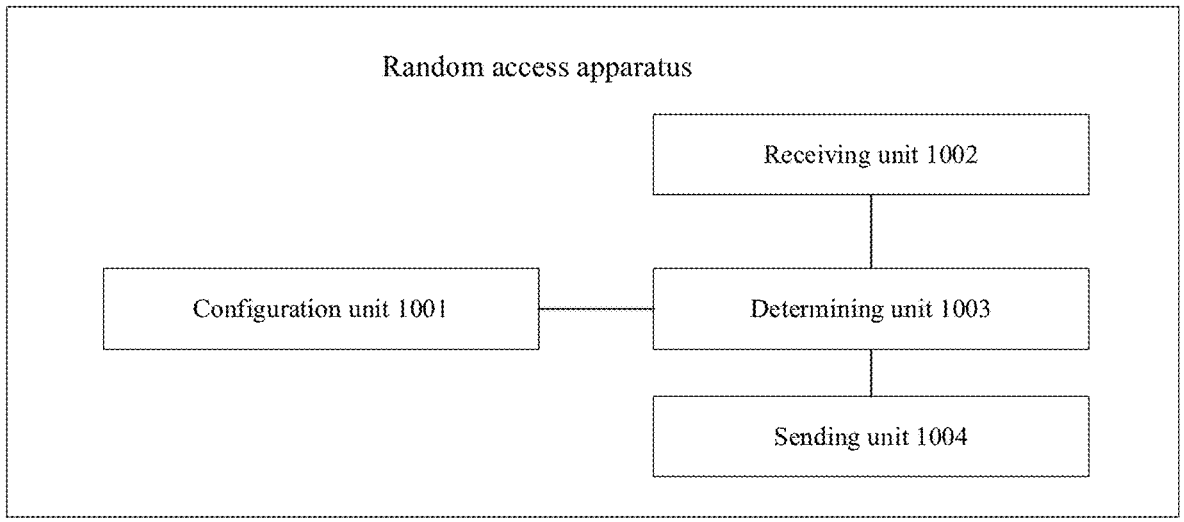
FIG. 10 is a first schematic diagram of the structural constitution of a random access apparatus provided by the embodiments of the present disclosure.

FIG. 10 is a first schematic diagram of the structural constitution of a random access apparatus provided by the embodiments of the present disclosure, as shown in FIG. 10, the apparatus includes a configuration unit 1001, configured to send first configuration information corresponding to a preamble and second configuration information corresponding to a PRACH resource; a receiving unit 1002, configured to receive MSG1; a determining unit 1003, configured to determine a format of RAR based on at least one of: a preamble corresponding to the MSG1, a PRACH resource corresponding to the MSG1, and whether MSG3 is detected the first time range; and a sending unit 1004, configured to send MSG2 based on the format of RAR.

In one embodiment, the first configuration information includes a first set of preambles for two-step random access procedure and a second set of preambles for four-step random access procedure.

In one embodiment, the receiving unit 1002 is configured to receive a first preamble and a second preamble on a same PRACH resource, where the first preamble belongs to the first set of preambles for the two-step random access procedure, and the second preamble belongs to the second set of preambles for the four-step random access procedure; and the determining unit 1003 is configured to determine that the first preamble corresponds to a first RAR format, and the second preamble corresponds to a second RAR format, where the first RAR format is used for the two-step random access procedure, and the second RAR format is used for the four-step random access procedure.

In one embodiment, the sending unit 1004 is configured to carry a first RAR and a second RAR in a same RAR MAC PDU, where the first RAR has the first RAR format, and the second RAR has the second RAR format; and send the RAR MAC PDU.

In one embodiment, the second configuration information includes a first PRACH resource for the two-step random access procedure and a second PRACH resource for the four-step random access procedure.

In one embodiment, the receiving unit 1002 is configured to receive a first preamble on a first PRACH resource, and receive a first preamble or a second preamble on a second PRACH resource; and the determining unit 1003 is configured to determine that the first PRACH resource corresponds to the first RAR format and the second PRACH resource corresponds to the second RAR format, where the first RAR format is used for the two-step random access procedure and the second RAR format is used for the four-step random access procedure.

In one embodiment, the sending unit 1004 is configured to carry a first RAR in a first RAR MAC PDU and carry a second RAR in a second RAR MAC PDU, where the first RAR has the first RAR format and the second RAR has the second RAR format; and send the first RAR MAC PDU and the second RAR MAC PDU.

In one embodiment, the first configuration information includes a set of preambles for the two-step random access procedure and the four-step random access procedure, and the second configuration information includes a PRACH resource for the two-step random access procedure and the four-step random access procedure.

In one embodiment, the receiving unit 1002 is configured to receive two identical preambles on a same PRACH resource; and the determining unit 1003 is configured to determine whether MSG3 is detected within a first time range; if the MSG3 is detected within the first time range, determines a first RAR format, where the first RAR format is used for the two-step random access procedure; and if no MSG3 is detected within the first time range, determines a second RAR format, where the second RAR format is used for the four-step random access procedure.

In one embodiment, if the network device determines the first RAR format, the sending unit 1004 carries a first RAR in a RAR MAC PDU, the sending unit 1004 sends the RAR MAC PDU, and the first RAR has the first RAR format; and if the network device determines the second RAR format, the sending unit 1004 carries a second RAR in a RAR MAC PDU, the sending unit 1004 sends the RAR MAC PDU, and the second RAR has the second RAR format.

In one embodiment, the sending unit 1004 is further configured to carry first indication information in the RAR MAC PDU, where the first indication information is used to indicate whether the RAR MAC PDU carries the first RAR or the second RAR.

In one embodiment, the configuration unit 1001 is further configured to send third configuration information corresponding to a PUSCH resource, where the PUSCH resource is used for transmission of the MSG3 in two-step random access procedure.

It should be understood by those skilled in the art that the relevant description of the above random access apparatus in the embodiments of the present disclosure may be understood with reference to the relevant description of the random access method in the embodiments of the present disclosure.

Figure 11:
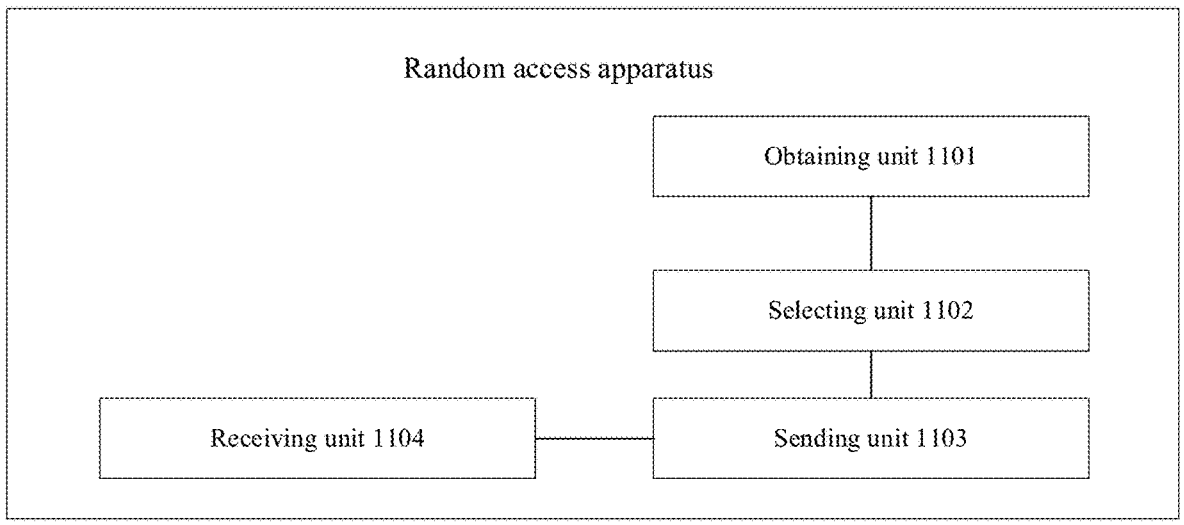
FIG. 11 is a second schematic diagram of the structural constitution of a random access apparatus provided by the embodiments of the present disclosure.

FIG. 11 is a second schematic diagram of the structural constitution of a random access apparatus provided by the embodiments of the present disclosure, as shown in FIG. 11, the apparatus includes an obtaining unit 1101, configured to obtain first configuration information corresponding to a preamble and second configuration information corresponding to a PRACH resource, where the first configuration information includes a first set of preambles for the two-step random access procedure and a second set of preambles for the four-step random access procedure, and/or the second configuration information includes a first PRACH resource for the two-step random access procedure and a second PRACH resource for the four-step random access procedure; a selecting unit 1102, configured to, if the two-step random access procedure is initiated, select a first preamble from the first set of preambles and/or select the first PRACH resource for sending MSG1; and if the four-step random access procedure is initiated, select a second preamble from the second set of preambles and/or select the second PRACH resource for sending MSG1; and a sending unit 1103, configured to send the MSG1.

In one embodiment, the obtaining unit 1101 is further configured to obtain third configuration information corresponding to a PUSCH resource, where the PUSCH resource is used for transmission of MSG3 in the two-step random access procedure.

In one embodiment, the apparatus further includes a receiving unit 1104, configured to receive MSG2, where a RAR MAC PDU in the MSG2 carries first indication information, where the first indication information is used to indicate whether the RAR MAC PDU carries a first RAR or a second RAR; and decode based on the first indication information to obtain the first RAR or the second RAR.

In one embodiment, the third configuration information includes a set of PUSCH resources; and the selecting unit 1102 is further configured to, if the two-step random access procedure is initiated, select a first PUSCH resource from the set of PUSCH resources for sending MSG3.

It should be understood by those skilled in the art that the relevant description of the above random access apparatus in the embodiments of the present disclosure may be understood with reference to the relevant description of the random access method in the embodiments of the present disclosure.

Figure 12:
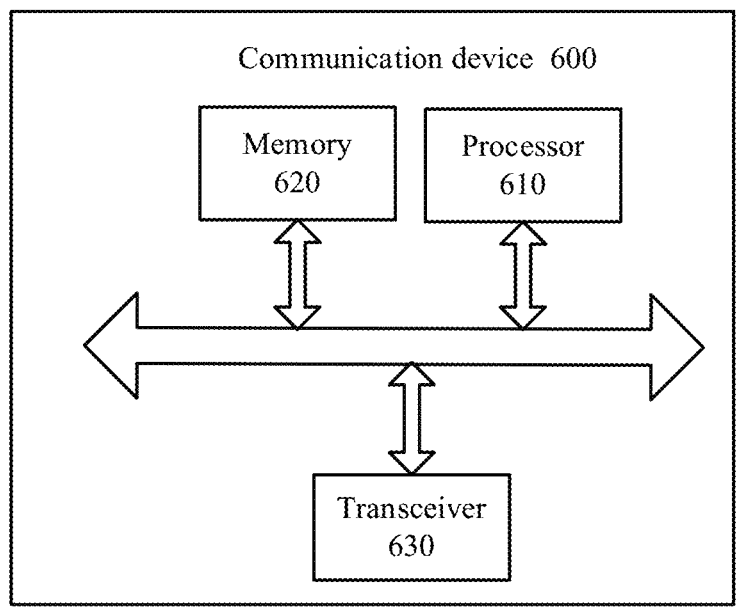
FIG. 12 is a schematic structural diagram of a communication device provided by the embodiments of the present disclosure.

FIG. 12 is a schematic structural diagram of a communication device 600 provided by the embodiments of the present disclosure. The communication device may be a network device or a terminal. The communication device 600 shown in FIG. 12 includes a processor 610, and the processor 610 may call and run a computer program from a memory to implement the method in the embodiments of the present disclosure.

Optionally, as shown in FIG. 12, the communication device 600 may also include a memory 620, where the processor 610 may call and run a computer program from the memory 620 to implement the method in the embodiments of the present disclosure.

The memory 620 may be a separate part independent of the processor 610, and may also be integrated in the processor 610.

Optionally, as shown in FIG. 12, the communication device 600 may also include a transceiver 630, and the processor 610 may control the transceiver 630 to communicate with other devices, and specifically, may send information or data to other devices, or receive information or data sent by other devices.

The transceiver 630 may include a transmitter and a receiver. The transceiver 630 may further include an antenna, the number of which may be one or more.

Optionally, the communication device 600 may specifically be the network device of the embodiments of the present disclosure, and the communication device 600 may implement the corresponding process implemented by the network device in each method of the embodiments of the present disclosure, which will not be described here again for brevity.

Optionally, the communication device 600 may specifically be the mobile terminal/terminal of the embodiments of the present disclosure, and the communication device 600 may implement the corresponding process implemented by the mobile terminal/terminal in each method of the embodiments of the present disclosure, which will not be described here again for brevity.

Figure 13:
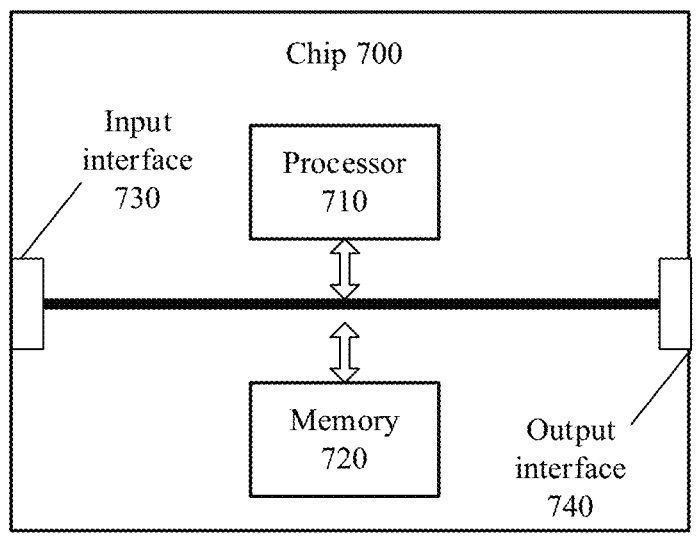
FIG. 13 is a schematic structural diagram of a chip of the embodiments of the present disclosure.

FIG. 13 is a schematic structural diagram of a chip of the embodiments of the present disclosure. The chip 700 shown in FIG. 13 includes a processor 710, and the processor 710 can call and run a computer program from a memory to implement the method in the embodiments of the present disclosure.

Optionally, as shown in FIG. 13, the chip 700 may also include a memory 720, where the processor 710 may call and run a computer program from the memory 720 to implement the method in the embodiments of the present disclosure.

The memory 720 may be a separate part independent of the processor 710, and may also be integrated in the processor 710.

Optionally, the chip 700 may also include an input interface 730, where the processor 710 may control the input interface 730 to communicate with other devices or chips, and specifically, may obtain information or data sent by other devices or chips.

Optionally, the chip 700 may also include an output interface 740, where the processor 710 may control the output interface 740 to communicate with other devices or chips, and specifically, may obtain information or data sent by other devices or chips.

Optionally, the chip may be applied to the network device in the embodiments of the present disclosure, and the chip may implement the corresponding process implemented by the network device in each method of the embodiments of the present disclosure, which will not be described here again for brevity.

Optionally, the chip may be applied to the mobile terminal/terminal in the embodiments of the present disclosure, and the chip may implement the corresponding process implemented by the mobile terminal/terminal in each method of the embodiments of the present disclosure, which will not be described here again for brevity.

It should be understood that the chip mentioned in the embodiments of the present disclosure may also be referred to as a system level chip, a system chip, a chip system, or a system-on-chip chip, etc.

Figure 14:
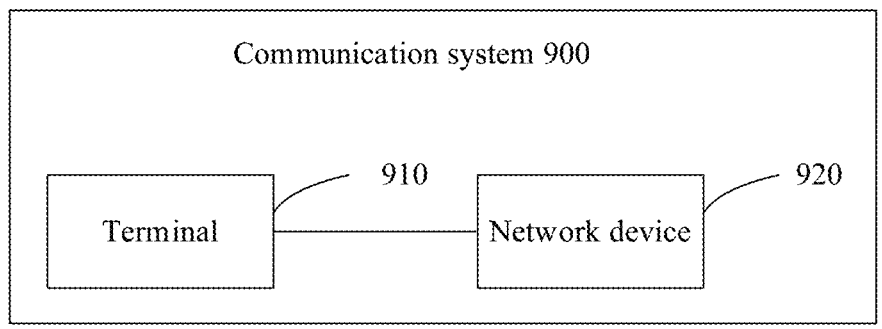
FIG. 14 is a schematic block diagram of a communication system provided by the embodiments of the present disclosure.

FIG. 14 is a schematic block diagram of a communication system 900 provided by the embodiments of the present disclosure. As shown in FIG. 14, the communication system 900 includes a terminal 910 and a network device 920.

The terminal 910 may be used to implement the corresponding function implemented by the terminal in the above method, and the network device 920 may implement the corresponding function implemented by the network device in the above method, which will not be described here again for brevity.

It should be understood that the processor of the embodiments of the present disclosure may be an integrated circuit chip with signal processing capability. In the implementation process, each step of the above method embodiments may be completed by hard ware integrated logic circuits in the processor or instructions in the form of software. The above processor may be a general-purpose processor, a digital signal processor (DSP), an application specific integrated circuit (ASIC), a field programmable gate array (FPGA) or other programmable logic parts, discrete gates or transistor logic parts, discrete hardware components. Each method, step and logic block diagram disclosed in the embodiments of the present disclosure may be implemented or executed. The general-purpose processor may be a microprocessor, or the processor may also be any conventional processor or the like. The steps of the method disclosed in combination with the embodiments of the present disclosure may be directly reflected as the execution by a hardware decoding processor, or by a combination of hardware and software modules in the decoding processor. The software module may be located in a mature storage medium of the art, such as a random access memory, a flash memory, a read-only memory, a programmable read-only memory or an electrically erasable programmable memory, a register, etc. The storage medium is located in the memory, and the processor reads information in the memory and completes the steps of the above method in combination with its hardware.

It can be understood that the memory in the embodiments of the present disclosure may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The non-volatile memory may be a Random Access Memory (RAM) which serves as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synch link DRAM (SLDRAM) and a Direct Rambus RAM (DR RAM). It should be noted that the memories of the system and method described herein are intended to include, but are not limited to these and any other suitable types of memories.

It should be understood that the above memory is exemplary but not limited restrictive. For example, the memory of the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. That is to say, the memories of the embodiments of the present disclosure are intended to include, but are not limited to these, and any other suitable types of memories.

The embodiment of the present disclosure also provides a computer-readable storage medium for storing computer programs.

Optionally, the computer-readable storage medium may be applied to the network device in the embodiments of the present disclosure, and the computer program enables the computer to execute the corresponding process implemented by the network device in each method of the embodiments of the present disclosure, which will not be described here again for brevity.

Optionally, the computer-readable storage medium may be applied to the mobile terminal/terminal in the embodiments of the present disclosure, and the computer program enables the computer to execute the corresponding process implemented by the mobile terminal/terminal in each method of the embodiments of the present disclosure, which will not be described here again for brevity.

The embodiment of the present disclosure also provides a computer program product including computer program instructions.

Optionally, the computer program product may be applied to the network device in the embodiments of the present disclosure, and the computer program instruction enables the computer to execute the corresponding process implemented by the network device in each method of the embodiments of the present disclosure, which will not be described here again for brevity.

Optionally, the computer program product may be applied to the mobile terminal/terminal in the embodiments of the present disclosure, and the computer program instruction enables the computer to execute the corresponding process implemented by the mobile terminal/terminal device in each method of the embodiments of the present disclosure, which will not be described here again for brevity.

The embodiment of the present disclosure also provides a computer program.

Optionally, the computer program may be applied to the network device in the embodiments of the present disclosure, and when the computer program runs on the computer, the computer is caused to execute the corresponding process implemented by the network device in each method of the embodiments of the present disclosure, which will not be described here again for brevity.

Optionally, the computer program product may be applied to the mobile terminal/terminal in the embodiments of the present disclosure, and when the computer program runs on the computer, the computer program is caused to execute the corresponding process implemented by the mobile terminal/terminal in each method of the embodiments of the present disclosure, which will not be described here again for brevity.

Those of ordinary skill in the art can be aware that the unit and algorithm step of each example described in conjunction with the embodiments disclosed herein may be implemented by electronic hardware, or a combination of computer software and electronic hardware. Whether these functions are executed in the form of hardware or software depends on the specific application and design constraints of the technical solution. Professionals and technicians may use different methods for each specific application to implement the described function, but such implementation should not be considered beyond the scope of the present disclosure.

Those skilled in the art can clearly understand that, for the convenience and conciseness of the description, the specific working process of the system, apparatus, and unit described above may refer to the corresponding process in the aforementioned method embodiments, which will not be described here again.

In the several embodiments provided by the present disclosure, it should be understood that the disclosed system, apparatus, and method may be implemented in other manners. For example, the apparatus embodiment described above is merely exemplary. For example, the division of the units is merely one kind of logical function division, and there may be other division manners in actual implementation. For example, multiple units or components may be combined or integrated in another system, or some features may be ignored or not executed. On the other hand, the mutual coupling or direct coupling or communication connection shown or discussed may be indirect coupling or communication connection through some interfaces, apparatus, or units, and may be in electrical, mechanical, or other forms.

The unit described as a separate component may or may not be physically separated, and the component displayed as a unit may or may not be a physical unit, that is, it may be located in one place, or may be distributed on multiple network units. Some or all of the units may be selected according to actual needs to achieve the objectives of the solutions of the embodiments.

In addition, each functional unit in each embodiment of the present disclosure may be integrated in one processing unit, or each unit may exist alone physically, or two or more above units may be integrated in one unit.

The functions may also be stored in a computer-readable storage medium if being implemented in the form of a software functional unit and sold or used as an independent product. Based on such understanding, the essence of the technical solution of the present disclosure or the part contributing to the prior art or part of the technical solution may be embodied in the form of a software product, and the computer software product is stored in a storage medium including several instructions such that a computer device (which may be a personal computer, a server, or a network device, etc.) executes all or part of the steps of the method described in each embodiment of the present disclosure. The aforementioned storage medium includes a U disk, a mobile hard disk, a read-only memory (ROM), a random access memory (RAM), a magnetic disk or an optical disk, and other mediums that can store program codes.

The foregoing descriptions are merely specific implementations of the embodiments of the present disclosure, and the protection scope of the embodiments of the present disclosure is not limited thereto. Any person skilled in the art can easily think of changes or substitutions within the technical scope disclosed in the present disclosure, and all the changes or substitutions should be covered in the protection scope of the present disclosure. Therefore, the protection scope of the present disclosure should be subject to the protection scope of the claims.

What is claimed is:

1. A method for random access, comprising:
sending, by a network device, first configuration information corresponding to a preamble and second configuration information corresponding to a physical random access channel (PRACH) resource;
receiving, by the network device, MSG1, and determining a format of random access response (RAR) based on at least one of a preamble corresponding to the MSG1, a PRACH resource corresponding to the MSG1, or whether MSG3 is detected within a first time range; and
sending, by the network device, MSG2, based on the format of RAR,
wherein the first configuration information comprises a first set of preambles for a two-step random access procedure and a second set of preambles for a four-step random access procedure,
wherein the receiving, by the network device, the MSG1, and the determining the format of RAR based on the preamble corresponding to the MSG1 comprises:
receiving, by the network device, a first preamble and a second preamble on a same PRACH resource, wherein the first preamble belongs to the first set of preambles for the two-step random access procedure, and the second preamble belongs to the second set of preambles for the four-step random access procedure; and
determining, by the network device, that the first preamble corresponds to a first RAR format, and determining, by the network device, that the second preamble corresponds to a second RAR format, wherein the first RAR format is used for the two-step random access procedure, and the second RAR format is used for the four-step random access procedure.

2. The method according to claim 1, wherein the second configuration information comprises a first PRACH resource for the two-step random access procedure and the four-step random access procedure.

3. The method according to claim 1, further comprising:
sending, by the network device, third configuration information corresponding to a physical uplink shared channel (PUSCH) resource, wherein the PUSCH resource is used for transmission of the MSG3 in the two-step random access procedure.

4. A network device, comprising:
a processor; and
a memory,
wherein the memory is used to store a computer program, and the processor is configured to call and run the computer program stored in the memory to:
send first configuration information corresponding to a preamble and second configuration information corresponding to a PRACH resource;
receive MSG1;
determine a format of RAR, based on at least one of a preamble corresponding to the MSG1, a PRACH resource corresponding to the MSG1, or whether MSG3 is detected within a first time range; and
send MSG2, based on the format of RAR;
wherein the first configuration information comprises a first set of preambles for a two-step random access procedure and a second set of preambles for a four-step random access procedure,
wherein, the processor is further configured to:
receive a first preamble and a second preamble on a same PRACH resource, wherein the first preamble belongs to the first set of preambles for the two-step random access procedure, and the second preamble belongs to the second set of preambles for the four-step random access procedure; and
determine that the first preamble corresponds to a first RAR format, and the second preamble corresponds to a second RAR format, wherein the first RAR format is used for the two-step random access procedure, and the second RAR format is used for the four-step random access procedure.

5. The network device according to claim 4, wherein the second configuration information comprises a first PRACH resource for the two-step random access procedure and the four-step random access procedure.

6. The network device according to claim 4, wherein the processor is further configured to send third configuration information corresponding to a PUSCH resource, and the PUSCH resource is used for transmission of the MSG3 in the two-step random access procedure.

7. A terminal, comprising:
a processor; and
a memory,
wherein the memory is used to store a computer program, and the processor is configured to call and run the computer program stored in the memory to:
obtain first configuration information corresponding to a preamble and second configuration information corresponding to a PRACH resource, wherein the first configuration information comprises a first set of preambles for a two-step random access procedure and a second set of preambles for a four-step random access procedure, and the second configuration information comprises a first PRACH resource for the two-step random access procedure and the four-step random access procedure;
when the two-step random access procedure is initiated, select a first preamble from the first set of preambles, and select the first PRACH resource for sending MSG1;

when the four-step random access procedure is initiated, select a second preamble from the second set of preambles, and select the first PRACH resource for sending MSG1; and send the MSG1 so that the network device determines that the first preamble corresponds to a first RAR format and that the second preamble corresponds to a second RAR format, wherein the first RAR format is used for the two-step random access procedure, and the second RAR format is used for the four-step random access procedure.

8. The terminal according to claim 7, wherein the processor is further configured to obtain third configuration information corresponding to a PUSCH resource, wherein the PUSCH resource is used for transmission of MSG3 in the two-step random access procedure.

9. The terminal according to claim 7, wherein the processor is further configured to:

receive MSG2, wherein a RAR MAC PDU in the MSG2 carries first indication information, and the first indication information is used to indicate whether the RAR MAC PDU carries a first RAR or a second RAR; and decode based on the first indication information to obtain the first RAR or the second RAR.

10. A method for random access, comprising:

obtaining, by a terminal, first configuration information corresponding to a preamble and second configuration information corresponding to a PRACH resource, wherein the first configuration information comprises a first set of preambles used for a two-step random access procedure and a second set of preambles used for a four-step random access procedure, and the second configuration information comprises a first PRACH resource used for the two-step random access procedure and the four-step random access procedure;

when the terminal initiates the two-step random access procedure, selecting a first preamble from the first set of preambles and selecting the first PRACH resource by the terminal for sending MSG1; and when the terminal initiates the four-step random access procedure, selecting a second preamble from the second set of preambles and selecting the first PRACH resource by the terminal for sending MSG1, so that the network device determines that the first preamble corresponds to a first RAR format and that the second preamble corresponds to a second RAR format, wherein the first RAR format is used for the two-step random access procedure, and the second RAR format is used for the four-step random access procedure.

11. The method according to claim 10, further comprising:

receiving, by the terminal, MSG2, wherein RAR MAC PDU in the MSG2 carries first indication information, and the first indication information is used to indicate whether the RAR MAC PDU carries a first RAR or a second RAR; and decoding, by the terminal, based on the first indication information to obtain the first RAR or the second RAR.

12. The method according to claim 10, further comprising:

obtaining, by the terminal, third configuration information corresponding to a PUSCH resource, wherein the PUSCH resource is used for transmission of MSG3 in the two-step random access procedure.

* * * * *